July 13, 1937.  A. H. VOIGHT  2,087,175
LAWN SPRINKLER
Filed March 11, 1936   2 Sheets-Sheet 1
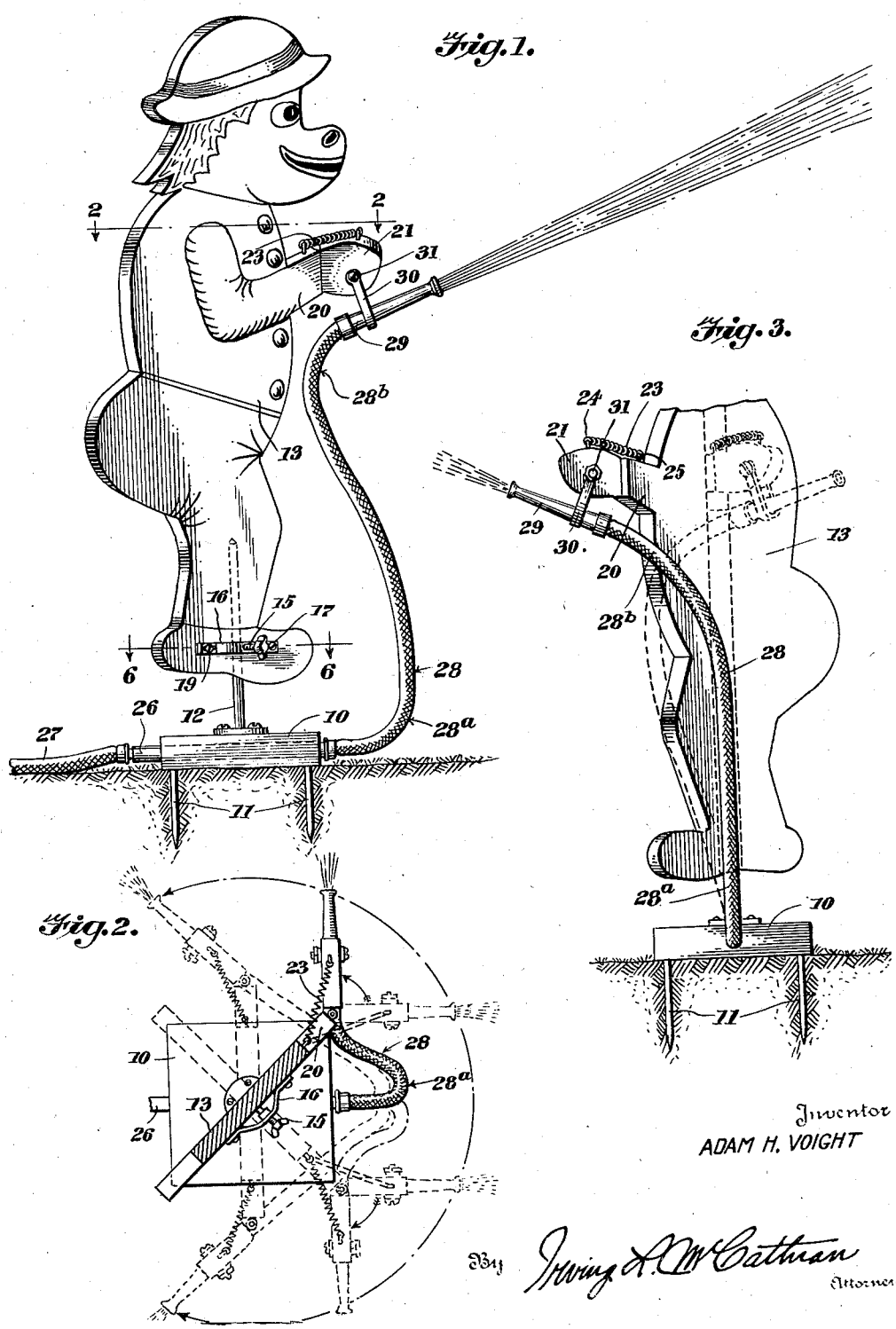
Inventor
ADAM H. VOIGHT July 13, 1937.  A. H. VOIGHT  2,087,175
LAWN SPRINKLER
Filed March 11, 1936  2 Sheets-Sheet 2
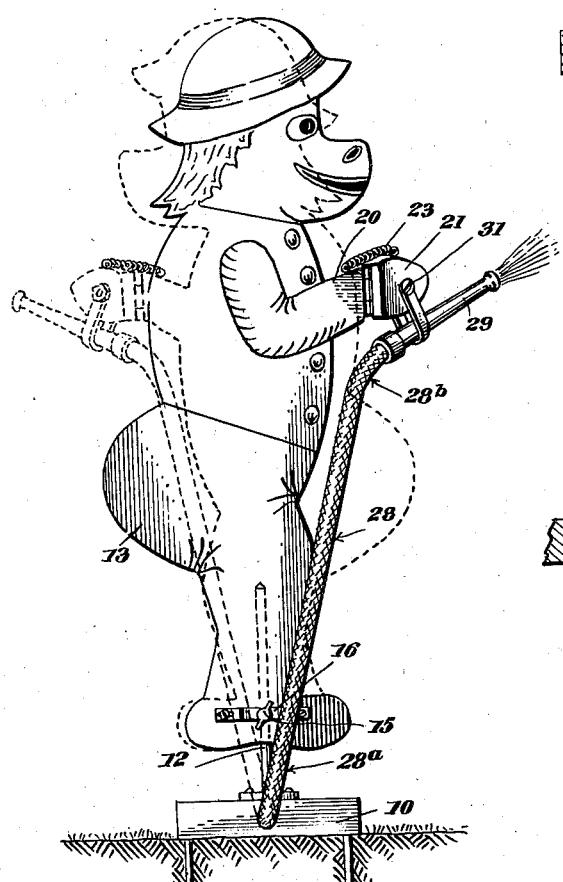
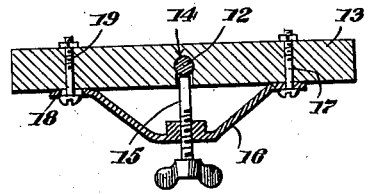
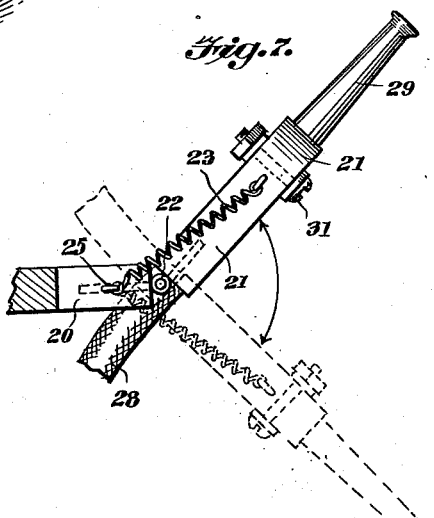
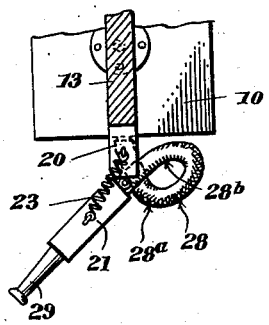
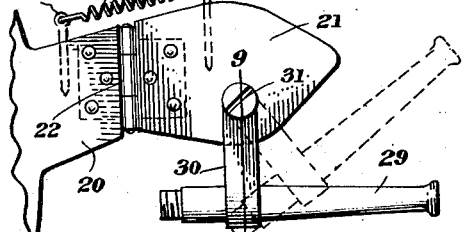
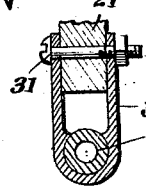
Inventor
ADAM H. VOIGHT Patented July 13, 1937

2,087,175

UNITED STATES PATENT OFFICE 2,087,175

LAWN SPRINKLER

Adam Henry Voight, Amsterdam, N. Y.

Application March 11, 1936, Serial No. 68,297

5 Claims. (Cl. 299—71)

This invention relates to lawn sprinklers, and has for one of its objects the production of a simple and efficient automatic novelty lawn sprinkler, which will be attractive in appearance and which will automatically swing from side to side to throw a spray of water over a wide area in the arc of a circle.

A further object of this invention is the production of a simple and efficient lawn sprinkler having a novel means for supporting a sprinkling nozzle, in a manner whereby the water discharged from the nozzle on the flexible hose will co-operate with the nozzle-supporting means for swinging or oscillating the sprinkler from side to side.

Other objects and advantages of the present invention will appear throughout the following specification and claims.

In the drawings:

Figure 1 is a side elevation of the sprinkler;

Figure 2 is a section taken on line 2—2 of Figure 1;

Figure 3 is a fragmentary front elevation of the sprinkler, one position of the image being shown in full lines and a second position being shown in dotted lines;

Figure 4 is a front elevation of the sprinkler, the positions of the image being reversed to that as shown in Figure 3;

Figure 5 is a fragmentary top plan view illustrating the body of the image in a central position;

Figure 6 is an enlarged transverse section taken on line 6—6 of Figure 1;

Figure 7 is a top plan view of the nozzle-supporting arm, a portion of the body of the image being shown in section;

Figure 8 is a side elevation of a portion of the nozzle-supporting arm, showing the nozzle attached thereto; and Figure 9 is a vertical section taken on line 9—9 of Figure 8.

By referring to the drawings, it will be noted that 10 designates the base which may be anchored in the ground or upon a suitable support by means of any suitable or desired character anchoring means but I preferably employ a plurality of pointed spikes 11 which extend into the ground and firmly hold the base 10 in position. The base 10 preferably comprises a square block upon which is mounted centrally thereof an upwardly extending journal pin 12. An image of any suitable or desired character in the nature of a grotesque or fanciful figure indicated by the numeral 13 is mounted to stand in an upright position upon the journal pin 12 and is rotatably mounted thereon, the pin 12 extending vertically of and within the vertical circular channel 14 extending up from the bottom of the figure or image 13. A thumb screw 15 is supported upon a spring yoke or bracket 16, and this bracket is anchored, as at 17, at one end, the opposite end of the spring yoke or bracket 16 being slotted, as at 18, and fitting under the head of the anchoring bolt 19 carried by the image 13. It will be seen that this spring yoke or bracket 16 may slide through the medium of its slotted end connection with the bolt 19 and by adjusting the thumb screw 15 the inner end of which engages the journal pin 12, the pressure of the end of the thumb screw 15 upon the pin 12 may be regulated to control the speed of the oscillation or turning of the journal pin 12.

The image 13 is provided with a projecting arm 20 extending in a forward direction to which arm is hingedly secured a hand portion 21 through the medium of a centrally located hinge 22. A coil spring 23 extends longitudinally of the upper face of the arm 20 and the hand portion 21 spanning the joint between the arm 20 and the hand portion 21, the spring 23 being anchored to the upper face of the hand portion 21 by means of a connecting pin 24, and being anchored at its opposite end to the upper face of the arm 20 by means of an anchoring pin 25.

The base 10 carries a hose connection 26 to which is secured a hose 27 leading from a suitable source of water pressure. The hose connection 26 extends through the base 10, and at its opposite end is connected a hose section 28 which hose section extends vertically and is connected to a spraying nozzle 29 which spraying nozzle is suspended below the hand portion 21 by means of a supporting yoke 30, this supporting yoke 30 being pivotally connected to the hand portion 21 by means of a pivot bolt 31 so that the angle of the nozzle 29 may be changed to elevate or lower the discharge end of the nozzle to increase or decrease the range of the spray, the adjusted position being indicated in Figure 8 in dotted lines. The nozzle 29 may be of the conventional type whereby the nature of the spray may be regulated as is common practice in nozzles of this character.

Careful consideration should be given to the position of the hose as indicated in Figures 1 to 5, wherein it will be noted that the hose assumes normally a position of a compound irregular reverse curve, the lower end of the hose 28 being curved abruptly from a vertical to a horizontal position near its lower end toward the base 10, as indicated at 28ª. The hose 28 is also curved abruptly from a vertical to a substantially horizontal position near its upper end in reverse direction or away from the body or image 13 and base 10 as indicated at 28ᵇ.

The operation of the device is as follows:

As water under pressure enters the hose 27, and passes through the connection 26 to the hose 28, the position of the image being that as shown in Figures 1 and 4 in full lines, the back thrust or pressure of the water discharged from the nozzle 29 tends to rotate the figure in a clockwise direction or toward the left, this latter position being shown in dotted lines in Figure 4. After the body or image 13 has swung beyond the half-way or the central position, and is moving toward the left, the pull of the hose upon the hand portion 21 will swing the hand portion from the position shown in Figure 7 to the dotted line position shown in Figure 7, the coil spring 23 assisting in causing the hand portion to snap from the full line to the dotted position shown in Figure 7, and remain in this position until the body or image 13 is rotated in the opposite direction beyond the central position to a point of approximately forty-five degrees. As the figure or image is swung from one side to the other, the hand portion 21 will snap from one position to its opposite thrown position when the pull of the hose 28 is in the opposite direction to the pull of the spring 23 and exceeds the pull of the spring 23. The different positions of the parts will be noted in Figure 2 and it should be understood that the momentum of the swing will tend to cause the body or figure 13 to oscillate substantially through the arc of a semi-circle. The swinging of the hand portion 21 will also increase the throw of the spray from the nozzle.

From the foregoing description it will be seen that a very simple and efficient means has been provided whereby the pressure of the water passing through the flexible hose 28 will cause the body or image 13 to oscillate upon its journal pin 12 or swing from side to side, at each swinging movement the hand portion 21 being also swung to provide a wide sprinkling range for the nozzle 29. The pressure of the water within the hose 28 will tend to straighten out the reverse curves of the hose when the hose assumes its opposite positions, this pressure and tendency to straighten out the hose accomplishing the oscillating movement of the image 13. It will be noted that the movement is accomplished through the operation of the water passing under pressure through the hose 28 and out through the nozzle 29, the hinged hand portion also assisting in this action, the pressure of the water acting against the curve of the hose and providing a proper pulling movement upon the flexible hose to produce this oscillating swing of the image 13.

It should be understood that any suitable or desired type of image may be used in connection with the present invention and it is not desired to limit the figure to that type as illustrated in the drawings. In constructing the device should the image not be provided with an arm or hand portion, the hinged portion which is designated in this case as the hand portion may constitute any extension or hingedly connected portion of the image without departing from the spirit of the invention.

It should be understood that certain detail changes in the mechanical construction, combination and arrangement of parts may be employed without departing from the spirit of the invention so long as such changes fall within the scope of the appended claims.

Having described the invention, what is claimed as new is:

1. A sprinkler of the class described comprising a base, a body, a journal for rotatably supporting said body upon said base, a hinged section carried by said body, a spraying nozzle carried by said hinged section and secured to said hinged section at a point offset with respect to the vertical axis of said body and journal, spring means tending to maintain said nozzle directed to one side or the other of a radial plane passing through the axis of rotation of the body, and a flexible conduit connected to said nozzle and the body and constructed and arranged to cause said nozzle to reverse its direction after a predetermined extent of rotation of the body with respect to the said radial plane.

2. A sprinkler of the class described comprising a base, a body, a journal for rotatably supporting said body upon said base, a hinged section carried by said body and extending forwardly therefrom, a spraying nozzle carried by said hinged section and secured to said hinged section in front of the hinge therefor at a point offset radially with respect to the vertical axis of said body and journal and extending longitudinally of the hinged section for discharging water forwardly therefrom, spring means tending to maintain the hinged section and the nozzle directed to one side or the other of a radial plane passing through the axis of rotation of the body, and a flexible hose extending vertically in front of said body with its upper portion directed forwardly and connected with the rear end of said nozzle and having its lower portion directed rearwardly and secured in a fixed position to said base, the flexible hose and the base and pivoted section cooperating with each other to cause the nozzle to reverse its direction after a predetermined extent of rotation of the body with respect to the said radial plane.

3. A sprinkler comprising a base, a body rotatably mounted on said base, an arm member pivotally mounted on said body, a nozzle mounted on said arm member, means tending to maintain said arm member and nozzle non-radial, a flexible hose attached to said nozzle at one end and fixedly connecting with a water supply in the base at its other end, said hose and arm member being so constructed and arranged that the discharge from the nozzle causes rotation of the body through a predetermined arc in one direction and then causes the arm member and nozzle to swing so as to cause rotation of the body through a predetermined arc in the opposite direction.

4. A sprinkler comprising a base, a body mounted to turn about a vertical axis over the base, a section carried by said body in radial spaced relation to the axis of the body and mounted to swing about a vertical pivot into diagonal positions at opposite sides of the radius of the body, a nozzle carried by said pivoted section and extending longitudinally thereof for discharging water outwardly therefrom, a spring extending longitudinally of said pivoted section across the pivotal mounting for the section and secured at its ends to the body and said section, a water connection carried by said base, and a flexible hose connected at its ends to the water connection and the nozzle and serving to exert transverse drag upon the pivoted section and snap the pivoted section from one side of the said radius to the other and cause the body to turn about its pivot in a predetermined arc first in one direction and then in an opposite direction.

5. A sprinkler comprising a base, a pin rising from said base, a water connection rigidly carried by said base, a body disposed over said base and mounted upon said pin to turn in an arc, an arm member extending from the front of said body and hinged to the body in radial offset relation to the pin to swing about a vertical axis from a non-radial position at one side of a radius of the body to a non-radial position at the other side of the said radius, a nozzle carried by said arm member and extending longitudinally thereof for discharging water outwardly and imparting turning movement to the body, a spring extending longitudinally of said arm member across said hinge and secured at its ends to the body and the arm member and yieldably holding the arm member in a non-radial position at either side of the said radius, and a flexible hose disposed vertically in front of said body with its ends connected to the nozzle and the water connection and exerting drag upon the nozzle to swing the arm member from one side of the said radius to the other and cause reverse of directional turning of the body.

ADAM HENRY VOIGHT.